(12) United States Patent
Fukuzumi

(10) Patent No.: US 6,314,195 B1
(45) Date of Patent: Nov. 6, 2001

(54) ORGANISM IDENTIFYING METHOD AND DEVICE

(75) Inventor: Shinichi Fukuzumi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/056,777

(22) Filed: Apr. 8, 1998

(30) Foreign Application Priority Data

Apr. 18, 1997 (JP) .................................................. 9-101897

(51) Int. Cl.[7] .............................. G06K 9/00; H07D 7/00
(52) U.S. Cl. .................... 382/115; 382/124; 340/5.53; 340/5.83
(58) Field of Search .................................. 382/115, 117, 382/118, 126, 100, 124, 128, 125, 127; 340/825.25, 365, 5.1, 5.2, 5.52, 5.53, 5.8, 5.81, 5.82, 5.83; 250/216

(56) References Cited

U.S. PATENT DOCUMENTS

| 4,336,998 | * | 6/1982 | Ruell | 356/71 |
| 4,358,677 | * | 11/1982 | Ruell et al. | 250/216 |
| 4,394,773 | * | 7/1983 | Ruell | 382/124 |
| 4,492,958 | * | 1/1985 | Minami | 340/825.25 |
| 5,719,950 | * | 2/1998 | Osten et al. | 382/115 |
| 5,737,439 | * | 4/1998 | Lapsley et al. | 382/115 |

FOREIGN PATENT DOCUMENTS 04-241680 * 8/1992 (JP) ................................ G06F/15/64

* cited by examiner

Primary Examiner—Jose L. Couso
Assistant Examiner—Duy M. Dang
(74) Attorney, Agent, or Firm—McGuireWoods LLP

(57) ABSTRACT

In an organism identifying device, a stimulus giving section gives a thermal stimulus to a finger, an organism information measuring section measures an organism information produced by said finger in response to the stimulus, and a determining section determines whether or not the organism information includes contents that the organism reflectively responds to the organism information.

2 Claims, 3 Drawing Sheets

ORGANISM IDENTIFYING METHOD AND DEVICE

BACKGROUND OF THE INVENTION

1. Field of the Invention

The present invention relates to an organism identifying method and device, more particularly to an organism identifying method and device which are used for preventing the forgery of a fingerprint by using organism informations when carrying out the personal identification by means of the fingerprint.

2. Description of the Related Art

The personal identification is carried out by sampling an amount of the characteristic of the person, such as a fingerprint, a voiceprint, a face image, any one of which shows the information peculiar to the individual person. Therefore, handling their informations by the digital data of high resolution raises the recognition ratio for the amount of the characteristic of the person. However, if the similar digital data related to a person is artificially made, the above identifying manner may erroneously recognize the data related to the article except the person. For example, when the personal identification is carried out by the use of the fingerprint, using a photograph on which the fingerprint of the principal is projected, and an artificial fingerprint in which the fingerprint of the principal is formed on the finger enables the personal identifying device using the above-mentioned fingerprint recognizing manner to be easily tricked, that is, possibly causes it to recognize the forged data or replica as the fingerprint of the principal. In order to resolve this problem, there has been devised methods of taking in the daily organism informations and then determining whether or not the fingerprint is of an organism, and of orally questioning the matters related to the principal when inputting the informations. As to a manner of taking in the daily organism information and then determining whether or not the fingerprint is of an organism, there has been disclosed in, for example, Japanese Patent Provisional Publication (Kokai) No. 4-241680 a manner of giving various stimuluses to the finger when inputting the fingerprint, and then sending a sign of directly inputting the fingerprint to the finger by the device, to thereby prevent the device from recognizing the replica having no sensory organ. There are cited the stimulus such as heat ray and vibration, the electrical stimulus, and the like which become the signs employed when the subject consciously inputs the fingerprint.

In other words, according to the prior art, by giving the stimulus which only an organism can detect, to the subject as the sign of inputting the fingerprint, the personal identifying device is prevented from erroneously recognizing the replica and the like placed on the fingerprint input surface of the fingerprint inputting device as the fingerprint directly obtained from the finger of the person.

Moreover, there are disclosed in Japanese Patent Provisional Publication (Kokai) No. 6-187430 a system of investigating the pulses, the blood pressure, and the like by using the pressure sensor, and a system of detecting the infrared rays radiated from the finger, by using the infrared ray sensor.

However, there are the following problems in each of the above-mentioned prior arts:

First, the technique described in the Japanese Patent Provisional Publication (Kokai) No. 4-241680 gives the stimulus which causes the sign used when the subject consciously inputs the fingerprint and which causes the clue when the subject reflectively inputs the fingerprint to the fingerprint recognizing device, and then accepts the input of the fingerprint in response to the sign or the clues. In such a technique, the respective stimuluses only act as the signs and the clues, but do not carry out the verification corresponding to the kinds of the stimuluses at the time of the subsequent confirmations of the fingerprints. If the stimulus is given as the mere sign or clue, detecting each of the stimuluses by any means and then inputting the forged data or input enables the fingerprint recognizing device to recognize the stimulus input by the genuine personnel. For example, in a system of using the heat as the stimulus, that is, a system of recognizing the fingerprint after detecting the body temperature of the person, attaching the temperature sensor on to the replica enables the fingerprint recognizing device to be tricked by applying the stimulus from the outside.

Moreover, in a system of investigating the pulses, the blood pressure, and the like by using the pressure sensor, and a system of detecting the infrared rays radiated from the finger, by using the infrared ray sensor, which are disclosed in Japanese Pattern Provisional Publication (Kokai) No. 6-187430, the output signal of the pressure sensor is simple. Accordingly, the article except the organism applying the pressure to the pressure sensor enables the pulse information and the blood pressure information to be applied to the pressure sensor. Furthermore, in the infrared ray detecting system, attaching the infrared ray emitting device to the replica of the finger, for example, enables the fingerprint recognizing device to be tricked.

SUMMARY OF THE INVENTION

The invention has been made in view of the above-mentioned various problems possessed by the prior art. It is therefore an object of the invention to provide a method and a device which is capable of measuring the organism information unconsciously fluctuating regardless of the subject's intention during a series of the movements at the time of inputting the fingerprint, by utilizing the reaction of the finger peculiar to an organism output from the personal recognizing device, and determining whether or not the reaction of the finger caused by the stimulus is of the fluctuation of the organism information peculiar to the person, thereby determining whether or not the input data is of the data directly obtained from the organism, not of the artificially reconstructed data.

According to one aspect of the invention, there is provided an organism identifying method characterized by comprising the steps of giving a stimulus to a finger by a contact portion on to which the finger contacts, detecting a first organism information produced by the finger in response to the stimulus, and determining that the finger contacting on to on the contact portion is of an organism when the detected first organism information includes a second organism information unconsciously produced by the finger in response to the stimulus.

On this occasion, the stimulus may comprise a cool stimulus and a hot stimulus.

According to another aspect of the invention, there is provided an organism identifying device characterized by comprising a stimulus giving section for giving a stimulus to a finger by a contact portion on to which the finger contacts, an organism information measuring section for measuring a first organism information produced by the finger in response to the stimulus, and a determining section for determining whether or not the finger contacting on to the contact portion is of an organism when the measured first organism information includes a second organism information unconsciously produced by the finger in response to the stimulus.

On this occasion, the stimulus applying section may comprise Peltier elements for applying a cool stimulus and a warm stimulus to the finger.

According to the invention constructed above, when the stimulus giving section gives the stimulus to the finger by the contact portion on to which the finger contacts, the organism information measuring section measures the organism information produced by the finger, and then the determining section determines whether or not the measured organism information includes contents that the organism reflectively reacts in response to the stimulus. Such a reaction cannot be, of course, produced by the replica, which results in the sure determination of the organism.

The stimulus can comprise the cool stimulus and the hot stimulus, although there are various stimuluses on which the organisms reflectively react. An amount of the fluctuation for the flow rate of the blood flowing in the peripheral vascular tracts varies according to the stimuluses, that is, the cool one or the hot one; therefore, when the presence of the fluctuation of its digital pulse wave that is non-electrical digital pulse in nature is detected, it is possible to identify whether or not the fingerprint is derived from the organism. Even the weak cool and hot stimuluses which cannot be sensed by the persons changes the digital pulse wave due to the action of the peripheral nervous system. Moreover, the amplitude of the digital pulse wave increases or decreases according to the stimuluses, that is, the cool one or the hot one. This cannot be known by the subject whose fingerprint is checked, thereby disabling the forged signal to be input from the outside. This means utilizes the action of the peripheral nervous system which reflect the organism's action, which prevents the forgery of the fingerprint in inputting the fingerprint.

Further object and advantages of the invention will be apparent from the following description of the preferred embodiments of the invention as illustrated in the accompanying drawings.

DETAILED DESCRIPTION OF THE PREFERRED EMBODIMENTS

Figure 1:
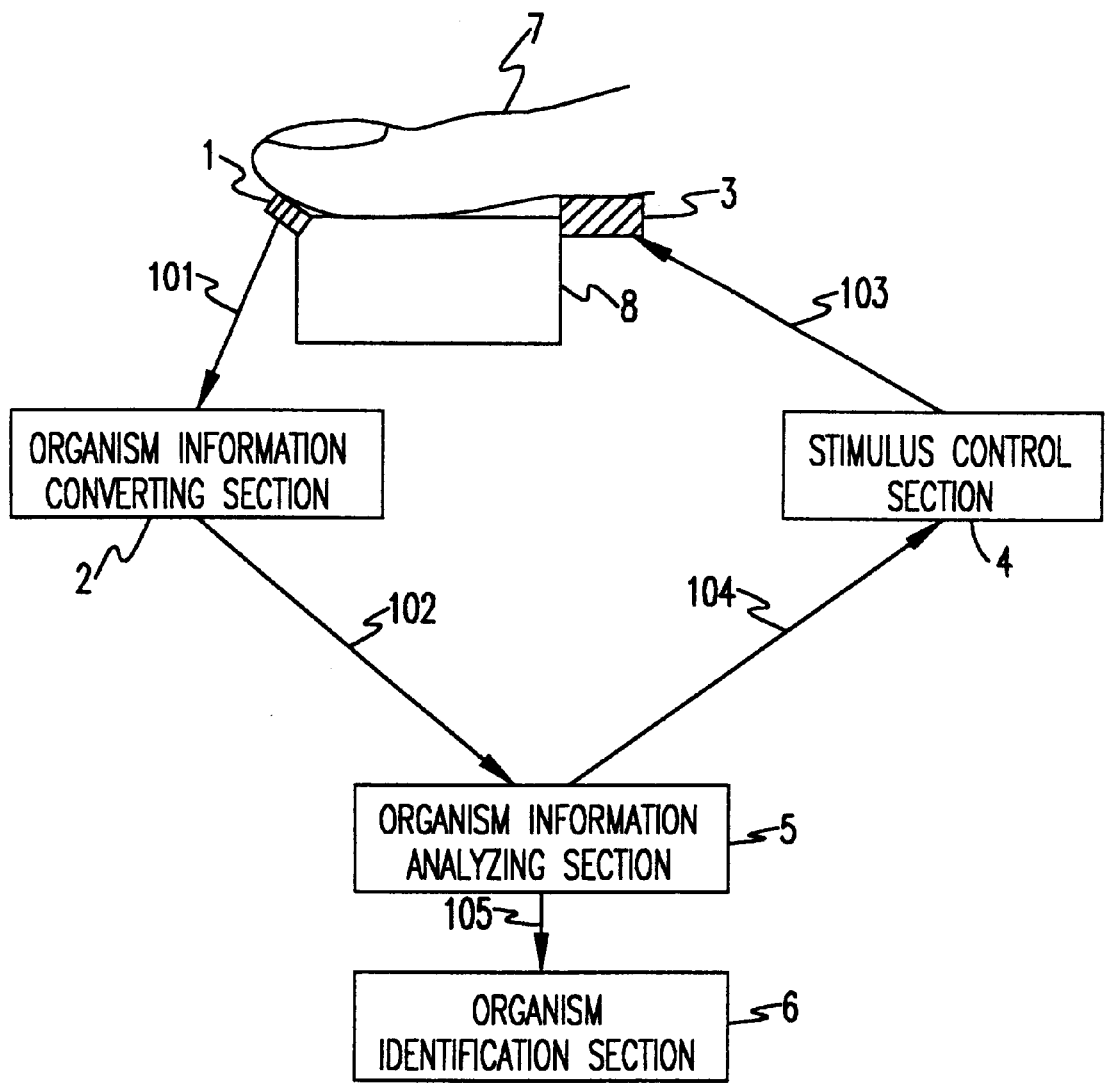
FIG. 1 is a view of a general arrangement of an organism identifying device according to an embodiment of the invention.

The inventions will now be described with reference to the drawings showing respective embodiments. There is shown in FIG. 1 a general arrangement of an organism identifying device according to an embodiment of the invention.

An organism identifying device according to an embodiment of the invention is constituted by an organism information measuring means comprising an organism information measuring section 1 and an organism information converting section 2, a stimulus applying means comprising a stimulus applying section 3 and a stimulus control section 4, and an organism identifying means, comprising an organism information analyzing section 5 and an organism identifying section 6, for determining whether a finger 7 is of an organism or of a replica. Only the finger which is determined to be of an organism by the organism identifying means is subjected to the dactyloscopy by a fingerprint input device 8. The process of the dactyloscopy due to the fingerprint input device 8 is a well known technique; therefore, there is mainly shown in FIG. 1 only an organism identifying system.

The stimulus applying section 3, comprising, for example, Peltier elements, applies a hot and a cool stimuluses to the finger 7 in response to a stimulus control signal 103 (analogue signal) transmitted from the stimulus control section 4. The stimulus control section 4 produces the above-mentioned control signal 103 based on a stimulus control information 104 (digital signal) including informations such as the timing, the time intervals, and the strength, etc., of the stimulus being applied, which is transmitted from the organism information analyzing section 5, and then transmits the produced information to the stimulus applying section 3.

The organism information measuring section 1 transmits an organism information 101 (digital signal) produced by the finger 7 in response to the hot or the cool stimulus mentioned above to the organism information converting section 2 as an analogue signal. The organism information converting section 2 converts the received organism information 101 to an organism information 102 used for the organism information analysis and then transmits it to the organism information analyzing section 5. The organism information analyzing section 5 transmits the stimulus control information 104 to the stimulus control section 4 to obtain the organism identifying information 105 based on the organism information 102 produced when applying the hot or the cool stimulus to the finger 7, and then transmits it to the organism identifying section 6. The organism identifying section 6 identifies whether the finger 7 is of an organism or a replica by using the organism identifying information 105.

The principle of determining whether or not the finger is of an organism, in this embodiment, will be now be described. When the finger 7 of an organism is applied with the hot or the cool stimulus by the stimulus applying section 3, peripheral vascular tracts of the tip of the finger 7 are extended or contracted. The amplitude value of the blood flow (digital pulse wave) obtained from the above-mentioned change of the peripheral vascular tracts is measured as the organism information 101 by the organism information measuring section 1. The measured organism information 101 is then transmitted to the organism information converting section 2 and then is subjected to the amplification and the digital conversion, and further transmitted to the organism information analyzing section 5 as the converted organism information 102. The organism information analyzing section 5, which has transmitted the stimulus control information 104 including the informations such as the timing, the time intervals, and the strength, etc., of the stimulus being applied, grasps these informations; therefore it can produce the organism identifying information 105 based on these informations and the organism information 102.

The amplitude of the digital pulse wave is increased in the case of the hot stimulus, while being decreased in the case of the cool stimulus. Moreover, according to the autonomic nervous system, the amplitude of the digital pulse wave is delayed a little with respect to the application of the stimulus.

Based on such a principle, the organism information analyzing section 5 analyzes the timing of the stimulus being applied, the time when the amplitude of the digital pulse wave is fluctuated, and the fluctuation pattern of the amplitude. When the finger 7 is of an organism, the digital pulse wave is fluctuated with the delay of 2 to 3 seconds with respect of the time when the stimulus is applied, whereas when the finger 7 is of a replica, it acts differently from the organism so long as the timing of the stimulus being applied and whether the stimulus is of the hot one or the cold one are not recognized even if the digital pulse wave is forged by any means. The organism information analyzing section 5 serves to give various hot or cool stimuluses, and the organism identifying section 6 determines whether or not the finger 7 is of an organism based on the kind of the stimulus, that is, the hot one or the cool one, and the then organism information.

The organism information measuring section 1 is disposed on one end of the fingerprint input device 8, and the stimulus applying section 3 is disposed on the other end of the fingerprint input device 8. The finger 7 is placed on the fingerprint input device 8 in such a manner that the tip of the finger 7 contacts to the organism information measuring section 1. The organism information measuring section 1 permanently measures the digital pulse wave during the finger contacts thereto, and then the measurement is converted by the organism information converting section 2 and then transmitted to the organism information analyzing section 5. The stimulus control section 4, comprising a personal computer and a D/A converter, controls the timing, the time intervals, and the strength, etc., of the stimulus being applied.

The timing, the time intervals, and the strength, etc., of the stimulus being applied exposed when the hot or the cool stimulus by means of the signal from the stimulus control section 4 are transmitted to the organism information analyzing section which analyzes how the amplitude of the digital pulse wave fluctuates in response to the stimulus based on these informations and the converted organism information 102.

Figure 2:
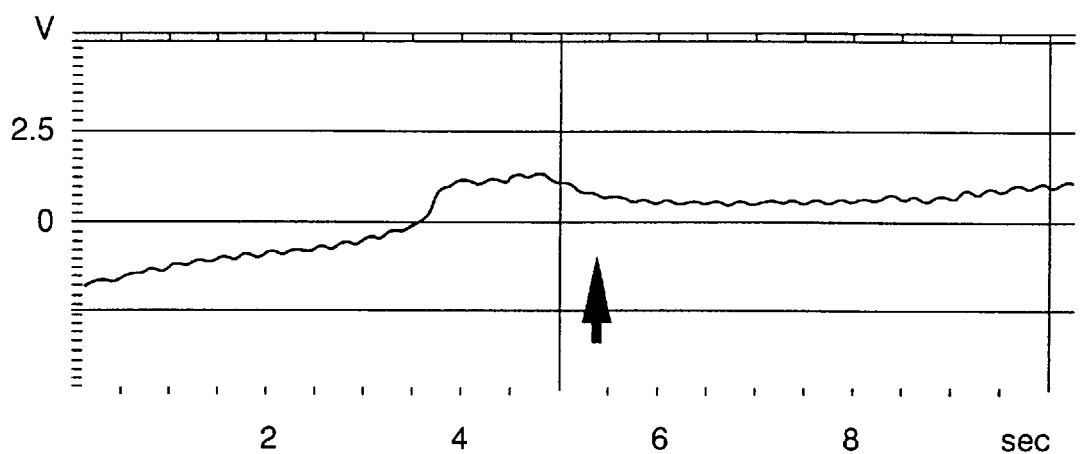
FIG. 2 is a view of the measurement obtained by using a replica of a finger in the organism identifying device shown in FIG. 1, in which the upward arrow represents the time at which a stimulus is applied.

When the finger is not of an organism in inputting the finger print, the digital pulse wave does not show a large amplitude as shown in FIG. 2. Therefore, giving the stimulus to the finger at the time of the upward arrow does not provide the fluctuation.

Figure 3:
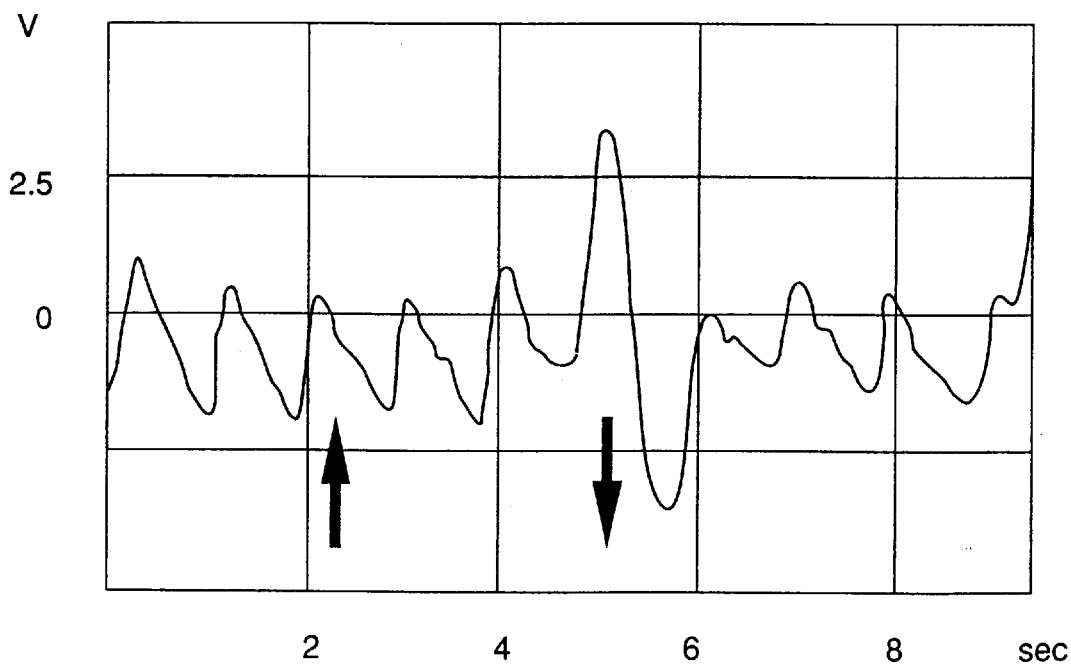
FIG. 3 is a view showing the measurement obtained by applying a hot stimulus to a finger of an organism, in which the upward arrow represents the time at which the hot stimulus is applied, and the downward arrow represents the time at which a digital pulse wave is observed to increase in amplitude.
Figure 4:
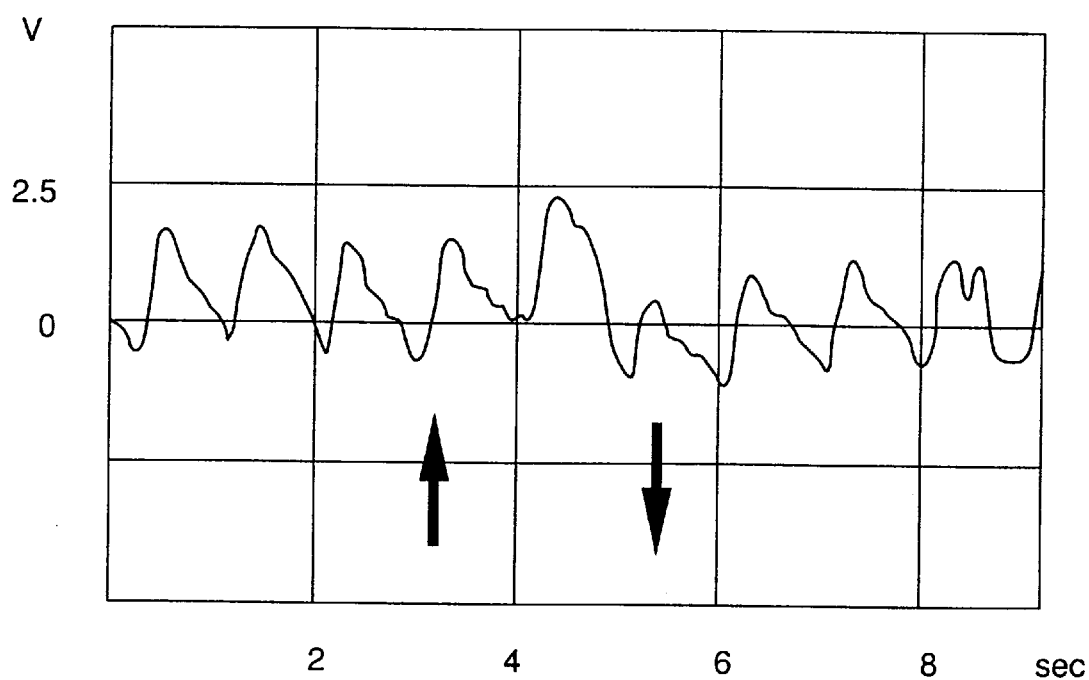
FIG. 4 is a view showing the measurement obtained by applying hot and cool stimuluses to a finger of an organism, in which the upward arrow represents the time at which the cool stimulus is applied, and the downward arrow represents the time at which a digital pulse wave is observed to decrease in amplitude.

However, when the finger is of an organism, giving the hot stimulus to the finger 7 at the time of the upward arrow increases the amplitude several seconds later at the time of the downward arrow as shown in FIG. 3, whereas giving the cool stimulus to the finger 7 at the time of the upward arrow decreases the amplitude several seconds later at the time of the downward arrow as shown in FIG. 4. According to the difference of the waveform, the organism identifying section 6 is capable of identifying whether or not the waveform is of an organism.

As described above, the organism identifying device according to the invention is capable of identifying whether or not the finger analyzed when the fingerprint is input is of an organism, and has an advantage that the forging of the fingerprint surely be prevented when the fingerprint is input.

Many widely different embodiments of the invention may be constructed without departing from the spirit and scope of the invention. It should be understood that the invention is not limited to the specific embodiment described in the specification, except as defined in the appended claims.

What is claimed is:

1. An organism identifying device provided with a personal verification apparatus for identifying a finger being verified is a real organism or not, said device comprising:

a first contact portion, on to which said finger to be verified contacts, for giving a stimulus, which is imperceptible to a sense of a person, to said finger;

a second contact portion, on to which other part of said finger to be verified contacts, for measuring a pulse of a peripheral blood vessel at a contact portion of said finger, and outputting the measured result as an organism information; and an organism determining portion for instructing said first contact portion the nature of stimulus to be given, for receiving the organism information from said second contact portion, and for determining whether the organism information is information of a real organism or not by detecting an expected fluctuation of pulse amplitude in response to the nature of stimulus having been instructed.

2. An organism identifying method for identifying a finger being used for a person verification is a real organism or not, said method comprising:

instructing the nature of stimulus from a control portion to a first contact portion on to which said finger is placed;

giving a stimulus, which is imperceptible to a sense of a person, to said finger at said first contact portion in accordance with the nature of stimulus having been instructed;

measuring a pulse of a peripheral blood vessel of said finger at a second contact portion on to which other part of said finger is placed;

outputting the measured result at said second contact portion as an organism information; and determining, at said control portion, whether organism information from said second contact potion is information of a real organism or not by detecting an expected fluctuation of pulse amplitude in response to the nature of stimulus having been instructed.

* * * * *